No. 712,456. Patented Oct. 28, 1902.
C. D. JANSSEN.
ROTARY ENGINE.
(Application filed Feb. 25, 1902.)
(No Model.) 2 Sheets—Sheet 1.
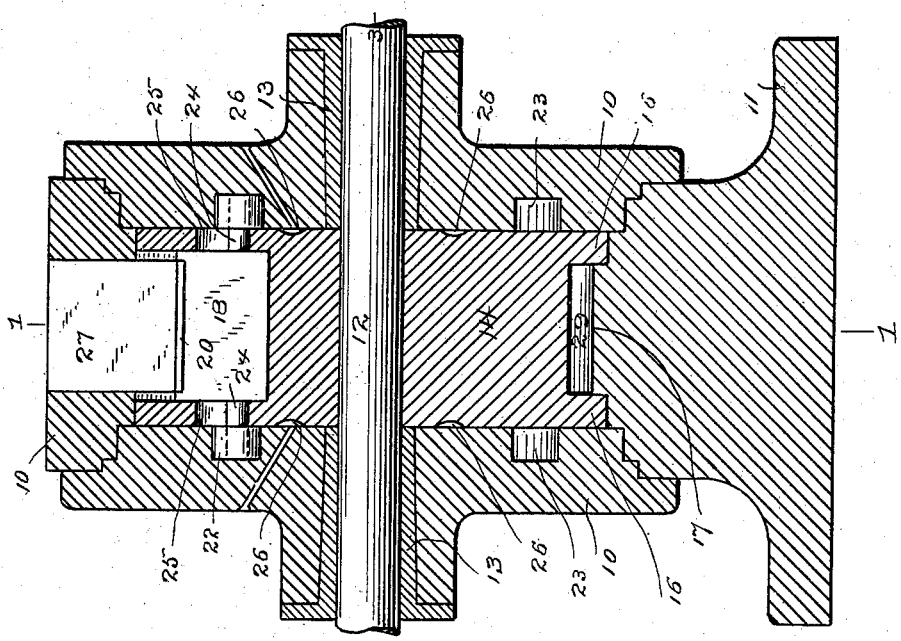

No. 712,456. Patented Oct. 28, 1902.
C. D. JANSSEN.
ROTARY ENGINE.
(Application filed Feb. 25, 1902.)
(No Model.) 2 Sheets—Sheet 2.
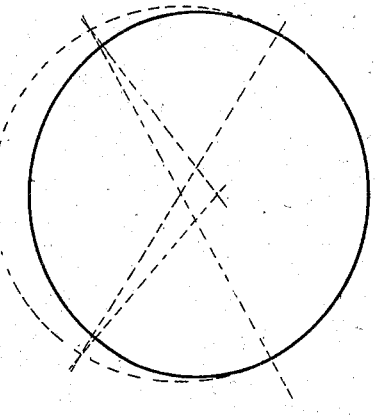
Fig. 6.
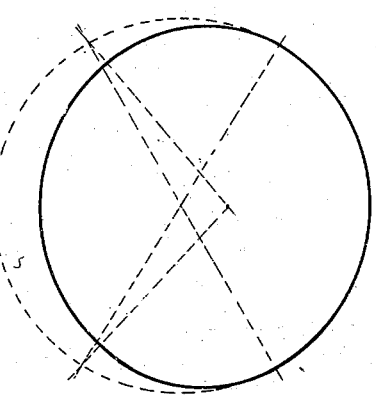
Fig. 7.
Fig. 4.
Fig. 5.
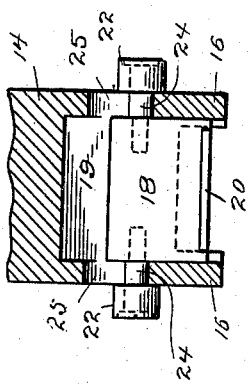
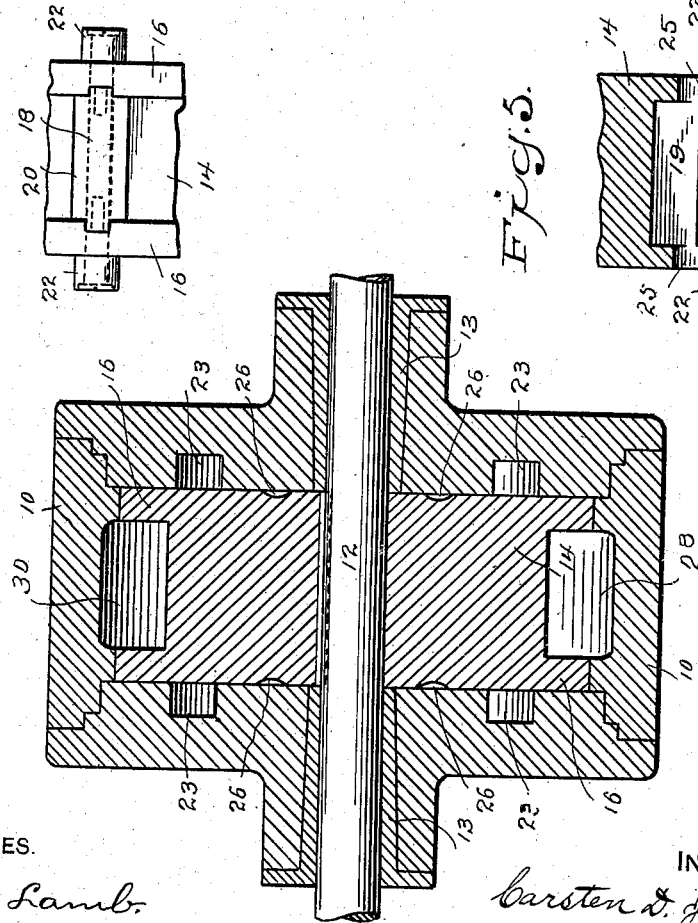
Fig. 3.
WITNESSES.
H. H. Lamb.
S. W. Atherton.
INVENTOR.
Carsten D. Janssen.
By
A. M. Wooster
Atty.

UNITED STATES PATENT OFFICE.

CARSTEN D. JANSSEN, OF TORRINGTON, CONNECTICUT, ASSIGNOR OF ONE-HALF TO JOHN H. ROSENBECK, OF TORRINGTON, CONNECTICUT.

ROTARY ENGINE.

SPECIFICATION forming part of Letters Patent No. 712,456, dated October 28, 1902.

Application filed February 25, 1902. Serial No. 95,597. (No model.)

*To all whom it may concern:*

Be it known that I, CARSTEN D. JANSSEN, a citizen of the United States, residing at Torrington, county of Litchfield, State of Connecticut, have invented a new and useful Rotary Engine, of which the following is a specification.

My invention has for its object to produce a mechanism adapted for use as a rotary engine, a water-motor, a gas or water meter, or a pump or blower, the essential features of my invention being that it is light, compact, and inexpensive to build and is, moreover, economical in use as a steam-engine, for the reason that the steam is used expansively and there is no loss of steam until the action of the steam upon the piston is ended. In the present instance I have illustrated the application of the principle of my invention to a rotary steam-engine and will describe it as a "rotary steam-engine," although it should be understood that the principle thereof is equally applicable to gas, hot-air, and other engines, and to motors, meters, and pumps without change in principle and without appreciable change in the details of construction.

In the accompanying drawings, forming part of this specification, Figure 1 is a transverse section of my novel engine on the line 1 1 in Fig. 2; Fig. 2, a section on the line 2 2 in Fig. 1; Fig. 3, a section on the line 3 3 in Figs. 1 and 2; Fig. 4, a detail plan view of a portion of the periphery of the drum, showing one of the pistons and the guide-rollers by which it is moved in or out; Fig. 5, a detail sectional view on a radius of the drum, showing one of the pistons in elevation; and Figs. 6 and 7 are diagrammatic views illustrating the mode in which the cam-grooves are laid out to produce different degrees of power and speed.

10 denotes the cylinder, supported by a base 11; 12, a shaft journaled in bearings 13 in the sides of the cylinder, and 14 a drum keyed to the shaft and adapted to rotate within the cylinder and carry the shaft. Steam is taken by means of ports 15, either of which may be an inlet or exhaust port, depending upon the direction in which it is desired to drive the shaft, the drum being adapted to rotate in either direction, as may be required. The drum is provided at its sides with flanges 16, and the portion of the peripheral wall of the cylinder which I have specifically indicated by 17 is made to fit closely between said flanges for a third, more or less, of the periphery of the cylinder, as clearly shown in Fig. 1. This is to prevent any escape of steam while it is acting upon a piston. In the drawings I have shown the engine as provided with three pistons 18, which are adapted to slide in radial recesses 19 in the drum. I have also shown the pistons as provided with T-heads 20, which in the retracted position lie in recesses 21 in the periphery of the drum. On opposite sides of the piston are studs 24, carrying rollers 22, which engage cam-grooves 23 in the inner side walls of the cylinder. The studs 24 pass through slots 25, leading from recesses 19 through the sides of the drum, the inner ends of the studs rigidly engaging the piston, as clearly shown in Fig. 5. It will be understood from Figs. 6 and 7, in connection with Fig. 1, that the portion of the cam-groove opposite to the ports, one-third approximately of the circumference of the groove, is an arc of a circle of which the axis of the drum is the center, while the other portion of the cam-groove is an arc of a circle of which some other point is the center. It will be obvious that variations in the flatness of the cam portion of the cam-groove and the corresponding variation in the throw of the pistons will have an important bearing on both the speed and the power of the engine.

26 denotes oil-receptacles in the drum, and 27 a bearing-block inserted in the cylinder-casting in position to be engaged by the periphery of the drum and the T-head of each piston when in the retracted position and make a practically steam-tight joint.

It will be noted that the steam-spaces within the cylinder, which I term the "inlet" and the "exhaust" steam-spaces and have indicated, respectively, by 28 and 30, are greatly enlarged—that is, of much greater capacity than the operative steam-space, which I have indicated by 29—that is, that portion of the cylinder in which the portion of the peripheral wall indicated by 17 fits closely between the flanges of the drum. This is in order to admit a large volume of steam into the cylinder at the inlet-port and also to permit free discharge of steam therefrom at the exhaust-port. In order to secure this result, it is essential that the inlet and exhaust ports and spaces or passages shall have greater cross-sectional area at all points of their length than that of the operative steam-space 29.

The operation of my novel rotary engine will be clearly understood from Fig. 1 in connection with the other figures of the drawings. Suppose the right port, as seen in Fig. 1, to be the inlet-port and the left port, as seen in said figure, to be the exhaust-port. The shape of the cam-grooves is such that a piston in the position indicated by $a$ in Fig. 1 will be at the fully-retracted position, the T-head lying in a recess 21, but being closely in engagement with the bearing-block, thereby preventing escape of steam. From the point indicated by $a$ to the point indicated by $b$—that is, while passing through the inlet-steam space—the piston will be moving outward until at the point indicated by $b$—that is, at the beginning of the operative steam-space the piston will be at its fully-thrown position and will closely engage the outer wall of said operative steam-space, in which position it will remain while passing therethrough and until it reaches the position indicated by $c$—that is, at the beginning of the exhaust steam-space—at which point it will commence to retract and the retraction will continue until it reaches the fully-retracted position at $a$. When it is desired to drive the shaft in the opposite direction, the inlet and exhaust steam-spaces will of course be reversed. The instant a piston reaches the thrown position at the point indicated by $b$ it closes the operative steam-space, and the steam behind it drives the drum forward until the next piston following closes the operative steam-space at the point indicated by $b$ and becomes the operative piston, and the former operative piston passes the point indicated by $c$, permitting the steam in front of the operative piston to pass into the exhaust steam-space, this operation being continuously repeated, each piston becoming in turn the operative piston while it remains in the thrown position and is passing through the operative steam-space and then moving to the retracted position, at which point it passes the bearing-block and then moves outward to the thrown position again and becomes the operative piston as it passes into the operative steam-space. It will be understood, of course, that the operative steam-space, in which each piston is at the fully-thrown position, corresponds with the portion of the cam-groove which is an arc of a circle of which the axis of the drum is the center. I find in practice that the T-heads upon the pistons by giving enlarged bearing-surface upon the wall of the cylinder make a practically steam-tight connection therewith, so that the steam in the operative steam-space acts with full force and effect upon the piston that is at that instant passing through said operative steam-space.

Having thus described my invention, I claim—

1. In an engine of the character described the combination with a drum and a cylinder inclosing said drum and having inlet, operative and exhaust steam-spaces and a groove in its side wall, a portion of which is an arc of a circle of which the axis of the drum is the center and the remaining portion an arc of a circle of which some other point is the center, the cross-sectional area of the inlet and exhaust steam-spaces at all points thereof being greater than that of the operative steam-space, of pistons in said drum having studs engaging the groove, whereby each piston is moved to the thrown position and retained there while passing through the operative portion of the steam-space and is then moved inward and then outward again.

2. In an engine of the character described the combination with a drum having radial recesses and a cylinder inclosing said drum and having inlet, operative and exhaust steam-spaces and a cam-groove in its side wall, the cross-sectional area of the inlet and exhaust steam-spaces at all points thereof being greater than that of the operative steam-space, of pistons in said recesses having studs engaging the cam-groove, whereby each piston is reciprocated during a rotation of the drum and caused to close the operative steam-space while passing through it.

3. In an engine of the character described the combination with a drum and a cylinder inclosing said drum and having inlet and exhaust steam-spaces and between said steam-spaces a reduced operative steam-space of less cross-sectional area than the inlet and exhaust spaces at any point of the latter, and having a cam-groove in its side wall, of pistons carried by the drum and engaging the cam-groove, whereby they are reciprocated during each rotation of the drum and caused to close the operative steam-space while passing through it, so that steam behind the piston in the operative steam-space will act to drive it forward.

4. In an engine of the character described the combination with a drum having side flanges and a cylinder inclosing said drum and having inlet and exhaust steam-spaces and between said steam-spaces a portion 17 of the peripheral wall made to fit closely between said flanges, whereby an operative steam-space is formed between the periphery of the drum and said wall, the cross-sectional area of the inlet and exhaust steam-spaces at all points thereof being greater than that of the operative steam-space, and having a cam-groove in its side wall, of pistons carried by the drum and engaging the cam-groove, whereby said pistons are moved to the thrown position and retained there while passing through the operative steam-space, then moved inward toward the retracted position and then moved outward again.

In testimony whereof I affix my signature in presence of two witnesses.

CARSTEN D. JANSSEN.

Witnesses:
 WILLIAM W. BIERCE,
 GEORGE W. GREENE.